US011856961B2

(12) United States Patent
Schulze et al.

(10) Patent No.: US 11,856,961 B2
(45) Date of Patent: Jan. 2, 2024

(54) APPARATUS AND METHOD FOR MOVING-ALONG TOOL POSITIONING AS WELL AS ASSEMBLY AND METHOD FOR WISHBONE REMOVAL

(71) Applicant: NORDISCHER MASCHINENBAU RUD. BAADER GMBH + CO. KG, Lübeck (DE)

(72) Inventors: Adrian Schulze, Lübeck (DE); Valentin Fischer, Lübeck (DE)

(73) Assignee: NORDISCHER MASCHINENBAU RUD. BAADER GMBH + CO. KG, Lübeck (DE)

( * ) Notice: Subject to any disclaimer, the term of this patent is extended or adjusted under 35 U.S.C. 154(b) by 46 days.

(21) Appl. No.: 17/920,454

(22) PCT Filed: Jul. 1, 2020

(86) PCT No.: PCT/EP2020/068516
§ 371 (c)(1),
(2) Date: Oct. 21, 2022

(87) PCT Pub. No.: WO2022/002386
PCT Pub. Date: Jan. 6, 2022

(65) Prior Publication Data
US 2023/0148615 A1 May 18, 2023

(51) Int. Cl.
*A22C 21/00* (2006.01)
(52) U.S. Cl.
CPC ...... *A22C 21/0069* (2013.01); *A22C 21/0053* (2013.01)

(58) Field of Classification Search
CPC .................. A22C 21/0069; A22C 21/0053
USPC ............................................ 452/135
See application file for complete search history.

(56) References Cited

U.S. PATENT DOCUMENTS

| 3,244,048 | A | 4/1966 | Salger |
| 4,315,449 | A | 2/1982 | Borzym |
| 5,163,865 | A | 11/1992 | Smith |
| 5,833,527 | A | 11/1998 | Hazenbroek |
| 6,986,707 | B2 * | 1/2006 | Van Den Nieuwelaar .................. A22C 21/0023 452/187 |
| 8,435,101 | B2 * | 5/2013 | Souli .................. A22C 21/0023 452/169 |
| 8,500,522 | B2 | 8/2013 | Drabbels et al. |
| 8,529,322 | B2 | 9/2013 | De Vos et al. |
| 8,801,508 | B2 | 8/2014 | Landt |

(Continued)

FOREIGN PATENT DOCUMENTS

| CN | 102711488 A | 10/2012 |
| CN | 103168821 A | 6/2013 |

(Continued)

*Primary Examiner* — Richard T Price, Jr.
(74) *Attorney, Agent, or Firm* — DINSMORE & SHOHL LLP

(57) ABSTRACT

An apparatus for the moving-along tool positioning of linearly conveyed articles includes a conveyor device forming a conveying line, a processing station arranged along the conveying line and having a processing tool, and a positioning unit having a transverse slide and a longitudinal slide for positioning the tools. An assembly for removing the wishbone from poultry carcasses has such an apparatus and utilizes corresponding methods.

49 Claims, 11 Drawing Sheets

(56) References Cited

U.S. PATENT DOCUMENTS

| | | | |
|---|---|---|---|
| 8,834,237 B2 * | 9/2014 | Van Hillo | A22C 21/0023 452/167 |
| 10,130,106 B2 | 11/2018 | Van Esbroeck et al. | |
| 2017/0127690 A1 | 5/2017 | Inoue et al. | |

FOREIGN PATENT DOCUMENTS

| | | |
|---|---|---|
| CN | 103702567 A | 4/2014 |
| CN | 107846911 A | 3/2018 |
| DE | 1257010 B | 12/1967 |
| DE | 3117293 A1 | 4/1982 |

* cited by examiner

US 11,856,961 B2

APPARATUS AND METHOD FOR MOVING-ALONG TOOL POSITIONING AS WELL AS ASSEMBLY AND METHOD FOR WISHBONE REMOVAL

CROSS-REFERENCE TO RELATED APPLICATIONS

This application is the U.S. National Stage of PCT/EP2020/068516 filed on Jul. 1, 2020, the entire content is herein referenced in its entirety.

FIELD OF THE INVENTION

The present invention relates to an apparatus for the moving-along tool positioning of linearly conveyed articles, as well as to an assembly for removing the wishbone from poultry carcasses with such an apparatus. The invention relates further to a method for the moving-along tool positioning of linearly conveyed articles as well as to a method for removing the wishbone from poultry carcasses.

Such apparatuses and methods are used whenever articles are continuously conveyed along a processing line and processing of the articles is to be carried out during the conveying process. For this purpose, the respective tools for processing must be moved along synchronously with the article to be processed during processing so that the tool and the article do not move relative to one another in the conveying direction.

BACKGROUND OF THE INVENTION

In particular in the field of the automatic processing of poultry carcasses, such apparatuses and methods are used to process the poultry bodies with different tools while they are being transported in a conveying direction.

Generally, the tools, in a work cycle, are moved along in the conveying direction parallel to the processing line so that the tools are stationary in the conveying direction from the point of view of the articles to be processed. Processing of the articles takes place during the work cycle. When processing is complete, the tools are moved back again contrary to the conveying direction in a return cycle so as to be brought into a starting position for the next processing operation.

It is therefore necessary to move the tools to and fro in and contrary to the conveying direction. Owing to the moment of inertia of the tools, high forces occur at the time of the change of direction. The maximum frequency of the to and fro movement is thus limited. An upper limit is therefore placed on the conveying speed, so that the number of articles which can be processed per unit of time is limited.

In addition, the high forces that occur lead to a considerable mechanical load on the drive, high mechanical wear and to pronounced vibrations, which make the movement of the tools appear "out of true".

Accordingly, it is an object of the present invention to propose an apparatus which ensures reliable positioning of moving-along tools, in particular also at a high conveying speed. In addition, it is an object of the invention to reduce to a minimum mechanical loads and vibrations that occur. The object consists further in proposing a corresponding method.

SUMMARY OF THE INVENTION

The object is achieved by the apparatus mentioned hereinbefore, which comprises a conveyor device forming a conveying line for conveying the articles in a conveying direction and having a plurality of receiving elements adapted to hold the articles, and a processing station arranged along the conveying line and having at least one processing tool adapted to process the articles, wherein the processing station has a positioning unit adapted to position the at least one processing tool, wherein the positioning unit is formed by a longitudinal slide, which is slidable in the conveying direction relative to a carrier element, and a transverse slide, which is arranged on the longitudinal slide so as to be slidable transverse to the conveying direction, wherein the longitudinal slide is driven in an oscillating manner such that the longitudinal slide on the one hand, in a work cycle, moves along synchronously with the receiving elements in the conveying direction from a starting position into an end position and on the other hand, in a return cycle, moves contrary to the conveying direction from the end position back into the starting position, and wherein the transverse slide has at least one guiding element which engages into a stationarily arranged link guide, wherein the link guide on the one hand is adapted, during the work cycle, to move the transverse slide transverse to the conveying direction towards the receiving elements from a standby position into a working position and from the working position back into the standby position, and on the other hand is configured, during the return cycle, to guide the transverse slide transverse to the conveying direction without deflection.

The apparatus according to the invention has the advantage that, by means of the positioning device, the at least one processing tool is positively guided both in the conveying direction and transverse to the conveying direction by means of the link guide. This effects on the one hand a concurrent movement that is always synchronous with the conveying speed during the work cycle and on the other hand an infeed movement transverse to the conveying direction that is bound to the conveying speed. In this manner, positioning of the at least one processing tool with high precision is always ensured. Advantageously, the processing station comprises a plurality of the processing tools which are moved in a correspondingly guided manner by means of the longitudinal and transverse slides of the positioning device.

An expedient embodiment of the invention is characterised in that the link guide comprises at least a work cycle guiding path and a return guiding path, wherein the return guiding path is configured so as to extend linearly parallel to the conveying line and the work cycle guiding path extends, starting from the return guiding path, in each case from the starting position and the end position of the longitudinal slide to the working position. The return guiding path is thus adapted to guide the longitudinal slide back precisely, without deflection of the transverse slide, while the work cycle guiding path is adapted to feed the transverse slide to the article to be processed transverse to the conveying direction during the work cycle and then to return it.

A preferred further development of the invention is distinguished in that the work cycle guiding path is in the form of a cam track. This has the advantage that the deflection of the transverse slide takes place as far as possible without vibrations. In addition, acting forces are reduced by the curved track and a generally "smoother" movement sequence is achieved. In particular, the cam track is adapted to be free of steps.

A further expedient embodiment of the invention is characterised in that the guiding element is in the form of a guiding wheel. In particular, the guiding wheel has ball bearings or is formed of a ball bearing. The guiding wheel has the advantage of low friction, so that the mechanical wear of the guiding element and the link guide is minimised and thus the lifetime of the apparatus according to the invention is increased. A further advantage is that the forces that occur are greatly reduced.

According to a further preferred embodiment, the work cycle guiding path and the return guiding path of the link guide are each in the form of guiding recesses in which the guiding wheel is guided. The guiding element is guided precisely and—where necessary—on both sides by the guiding recess.

A further expedient embodiment of the invention is characterised in that the guiding recesses have a predetermined excess relative to the guiding wheel in the respective transition regions between the work cycle guiding path and the return guiding path. This has the advantage that, specifically at the reversal points at which the directions of movement change, namely that of the longitudinal slide in the conveying direction and vice versa and that of the transverse slide towards the articles and back again transverse to the conveying direction, the guiding element is no longer in contact with the link guide.

In other words, the guiding element is not in guiding engagement with the link guide at the above-mentioned reversal points. Guiding thus becomes "loose" at the reversal points. Advantageously, strong forces acting suddenly on the link guide are thus avoided and a calmer movement sequence overall is achieved, and the occurrence of high pulse-like force effects is reliably avoided. Overall, the tendency of the apparatus as a whole to vibrate is improved.

A preferred further development of the invention is distinguished in that pivotable guide elements are arranged in the guiding recess, namely a first guide element on the starting position side in the region of the transition from the return guiding path to the work cycle guiding path and a second guide element on the end position side in the region of the transition from the work cycle guiding path to the return guiding path. By means of the guide elements it is ensured that the guiding element always changes from the return guiding path to the work cycle guiding path and vice versa. Thus, precise guiding is ensured in every cycle.

According to a further preferred embodiment of the invention, the first and second guide elements are each arranged so as to be pivotable out of and into the path plane of the guiding recesses. Thus, the guiding element is able to pass through the respective guiding path without any blockages.

According to a further preferred embodiment of the invention, the first guide element comprises a return guiding path blocking element which is configured and adapted to allow the guiding element to pass during the return cycle by pivoting out of the path plane of the return guiding path and, after the guiding element has passed, to block the return guiding path for passage of the guiding element during the work cycle by pivoting of at least the return guiding path blocking element into the path plane of the guiding recess of the return guiding path.

The return guiding path blocking element is thus adapted to allow the guiding element to pass when the guiding element is moving in the return guiding path contrary to the conveying direction. When the guiding element is moving in the conveying direction, the return guiding path blocking element pivoted into the path plane of the guiding recess forms a wall of the guiding recess and guides the guiding element into the work cycle guiding path. Thus it is ensured that the guiding element is always guided precisely from the return guiding path into the work cycle guiding path.

A further expedient embodiment of the invention is characterised in that the return guiding path blocking element comprises a first guiding element sensing part and a work cycle guiding path part, wherein the first guiding element sensing part is of ramp-like form with a width that increases contrary to the conveying direction, and wherein the work cycle guiding path part forms at least a first wall section of the work cycle guiding path. The first guiding element sensing part with the mentioned ramp-like form has the advantage that the guiding element slides over the first guiding element sensing part while at the same time being pivoted. The first guiding element sensing part thus allows the guiding element to pass while it is moving contrary to the conveying direction. By contrast, the work cycle guiding path part in the non-deflected state forms the first wall section of the work cycle guiding path. In this manner, the guiding element is always reliably transferred from the return guiding path into the work cycle guiding path.

According to a further preferred embodiment, the second guide element comprises a work cycle guiding path blocking element which is configured and adapted to allow the guiding element to pass during the work cycle by pivoting out of the path plane of the work cycle guiding path and, after the guiding element has passed, to block the work cycle guiding path for passage of the guiding element during the return cycle by pivoting of at least the work cycle guiding path blocking element into the path plane of the guiding recess of the work cycle guiding path. The work cycle guiding path blocking element—analogously to the return guiding path blocking element—ensures that the guiding element is always guided precisely from the work cycle guiding path into the return guiding path.

The work cycle guiding path blocking element is thus adapted to allow the guiding element to pass when the guiding element is moving in the work cycle guiding path in the conveying direction. When the guiding element is moving in the conveying direction, the work cycle guiding path blocking element pivoted into the path plane of the guiding recess forms a wall of the guiding recess and guides the guiding element into the return guiding path.

A further expedient embodiment of the invention is characterised in that the work cycle guiding path blocking element comprises a second guiding element sensing part and a return guiding path part, wherein the second guiding element sensing part is of ramp-like form with a width that increases in the conveying direction, and wherein the return guiding path part forms at least a second wall section of the return guiding path. The second guiding element sensing part with the mentioned ramp-like form has the advantage that the guiding element slides over the second guiding element sensing part while at the same time being pivoted. The second guiding element sensing part thus allows the guiding element to pass while it is moving in the conveying direction. By contrast, the return guiding path part in the non-deflected state forms the first wall section of the return guiding path. In this manner, the guiding element is always reliably transferred from the work cycle guiding path into the return cycle guiding path.

According to a further preferred embodiment of the invention, the first guide element and the second guide element are configured such that they pivot back into the path plane automatically. Advantageously, after the guiding element has passed, the respective guiding path is thus automatically barred. For example, the first and second guide elements are adapted such that they pivot back automatically under the force of gravity.

A further expedient embodiment of the invention is characterised in that there are arranged on the first guide element and/or on the second guide element restoring means which are adapted to pivot those elements back into the path plane automatically. This has the advantage that the restoring force is adjustable by the choice of the restoring means. The time taken for the elements to pivot back can be adapted according to the magnitude of the restoring force. Increasing the restoring force effects more rapid restoring, so that the restoring operation takes place sufficiently quickly even at high conveying speeds.

According to a further preferred embodiment, the conveyor device comprises a conveyor chain, on which the receiving elements are arranged, and a drive for driving the conveyor chain, wherein the drive comprises at least one continuously circulating belt drive or chain drive with which the longitudinal slide is coupled by means of a coupling rod. Thus, the movement sequence of the longitudinal slide is rigidly mechanically coupled with the movement of the conveyor device. This has the advantage of absolute synchronicity between the positioning device according to the invention and the receiving elements of the conveyor device. Preferably, the drive comprises a drive motor for driving the conveyor chain of the conveyor device. The belt drive or chain drive is mechanically coupled with the conveyor chain. The belt and/or chain drive is in this case driven by the conveyor chain.

Any fluctuations in the conveying speed are thus synchronously transferred to the movement sequence of the longitudinal slide and of the transverse slide. In this manner, it is always ensured that the movements of the longitudinal and transverse slides are synchronised with the conveying speed.

A further expedient embodiment of the invention is characterised in that the positioning unit comprises a longitudinal slide spring unit which is configured and adapted to be spring-pretensioned between the longitudinal slide and the carrier element when a predefined return position of the longitudinal slide is reached during a return cycle. The longitudinal slide spring unit has the advantage that the longitudinal slide is slowed down gently. In addition, the longitudinal slide spring unit accumulates mechanical energy during the return cycle, which subsequently assists the operation of accelerating the longitudinal slide and the transverse slide at the beginning of the work cycle.

The longitudinal slide spring unit in this manner assists the drive of the positioning unit according to the invention. Drive forces acting in the drive section are thus significantly reduced. Overall, an extremely low-vibration movement sequence with high running smoothness is achieved. Preferably, the longitudinal slide spring unit is configured such that it is spring-pretensioned over a distance of at least two thirds of the total return distance.

According to a further preferred embodiment of the invention, the longitudinal slide spring unit comprises at least one longitudinal spring element which is arranged on one side on the carrier element and the one free longitudinal spring element side of which is adapted to come into mechanical contact with a longitudinal counter-surface element arranged on the longitudinal slide when the predefined return position is reached. The longitudinal spring element is thus spring-pretensioned when the predefined return position is reached. Over the remaining part of the return distance, the longitudinal spring element is not in mechanical engagement and is relaxed.

Alternatively, the longitudinal slide spring unit comprises at least one longitudinal spring element which is arranged on one side on the longitudinal slide and the one free longitudinal spring element side of which is adapted to come into mechanical contact with a longitudinal counter-surface element arranged on the carrier element when the predefined return position is reached. Preferably, the at least one longitudinal spring element is in the form of a compression spring or in the form of a tension spring.

A further expedient embodiment of the invention is characterised in that the positioning unit comprises a transverse slide spring unit which is configured and adapted to be spring-pretensioned between the transverse slide and the longitudinal slide when a predefined deflected position of the transverse slide is reached during a work cycle. The above-mentioned advantages of the longitudinal slide spring unit apply analogously also to the transverse slide spring unit. The transverse slide spring unit on the one hand has the advantage that the transverse slide is slowed down gently on transfer from the work cycle to the return cycle. On the other hand, the transverse slide spring unit is adapted, during the work cycle, to be pretensioned in order to store mechanical energy which is used at the beginning of the return cycle to accelerate the transverse slide.

According to a further preferred embodiment, the transverse slide spring unit comprises at least one transverse spring element which is arranged on one side on the longitudinal slide and the one free transverse spring element side of which is adapted to come into mechanical contact with a transverse counter-surface element arranged on the transverse slide when the predefined deflected position is reached. Until the predefined deflected position is reached, the transverse spring element is not in mechanically acting contact with the transverse slide.

Pretensioning of the transverse spring element only takes place once the predefined deflected position has been reached. This has the advantage that no additional tensioning work is to be performed by the drive specifically at the beginning of the acceleration phase. Only when the transverse slide has a certain speed transverse to the conveying direction is some of the drive energy used to perform tensioning work for pretensioning the transverse spring element. Preferably, the predefined deflected position is situated at approximately ⅓ of the total forward travel distance during the work cycle. That is to say, no pretensioning of the transverse spring element takes place over the first third of the forward travel distance. The transverse spring element is pretensioned over ⅔ of the forward travel distance.

According to a further preferred embodiment of the invention, the transverse slide spring unit comprises at least one transverse spring element which is arranged on one side on the transverse slide and the one free transverse spring element side of which is adapted to come into mechanical contact with a transverse counter-surface element arranged on the longitudinal slide when the predefined deflected position is reached. This preferred embodiment is an alternative form of the preferred embodiment mentioned above. The transverse spring element can thus be arranged on one side either on the longitudinal slide or on the transverse slide. Further preferably, the at least one transverse spring element is in the form of a compression spring or in the form of a tension spring.

According to a further preferred embodiment, the carrier element is adapted to be adjustable in terms of its position transverse to the conveying direction. In this manner, the positioning unit can be optimally oriented transverse to the conveying direction and the distance between the processing tools can be optimally adapted to different types of article.

The invention relates further to the assembly mentioned hereinbefore for removing the wishbone from poultry carcasses, which comprises a mentioned apparatus for the moving-along tool positioning of linearly conveyed articles, wherein the articles are poultry carcasses, the receiving elements are adapted to hold in each case one of the poultry carcasses with its neck side facing the processing station, and the at least one processing tool is in the form of a wishbone removal unit.

This has the advantage that the at least one wishbone removal unit is adapted to be positionable precisely and as quickly as possible by means of the apparatus according to the invention. By means of the positioning unit of the apparatus according to the invention, the at least one wishbone removal unit, during the work cycle, is on the one hand moved parallel to and synchronously with the receiving elements conveyed in the conveying direction. On the other hand, the at least one wishbone removal unit is moved transverse to the conveying direction towards the receiving elements via an infeed movement in order to bring the wishbone removal unit into a position close to the poultry carcasses as is required for processing.

The wishbone removal unit itself therefore does not need to perform its own infeed movement towards the poultry carcasses. The movement sequence of the wishbone removal unit can therefore be limited to the necessary movement of the separating devices which interact with the poultry body, so that these are carried out correspondingly quickly. In this manner, the throughput, that is to say the number of poultry carcasses which can be processed per unit time, can be significantly increased and the conveyor device can be operated with a correspondingly high conveying speed.

The object is further achieved by the corresponding method mentioned hereinbefore for the moving-along tool positioning of linearly conveyed articles, comprising the steps:

Conveying the articles by means of a plurality of receiving elements adapted to hold the articles in a conveying direction along a conveying line on which there is arranged a processing station having at least one processing tool adapted to process the articles, by means of a conveyor device forming the conveying line, wherein the processing station has a positioning unit adapted to position the at least one processing tool, wherein the positioning unit is formed by a longitudinal slide, which is slidable in the conveying direction relative to a carrier element, and a transverse slide, which is arranged on the longitudinal slide so as to be slidable transverse to the conveying direction; driving the longitudinal slide in an oscillating manner such that the longitudinal slide on the one hand, in a work cycle, moves along synchronously with the receiving elements in the conveying direction from a starting position into an end position and on the other hand, in a return cycle, moves contrary to the conveying direction from the end position back into the starting position; and moving the transverse slide during the work cycle transverse to the conveying direction towards the receiving elements from a standby position into a working position and from the working position back into the standby position by means of at least one guiding element which engages into a stationarily arranged link guide; and guiding the transverse slide without deflection during the return cycle transverse to the conveying direction by means of the link guide. The advantages of the method according to the invention have already been explained in detail in connection with the apparatus according to the invention. Because the method steps are analogous to the apparatus, reference is made at this point and in relation to the advantageous further developments of the method according to the invention described in the following text to the advantages already mentioned in connection with the apparatus.

A further expedient embodiment of the invention is characterised by moving the transverse slide during the work cycle by means of at least one work cycle guiding path of the link guide and moving the transverse slide during the return cycle by means of a return guiding path which extends linearly and runs parallel to the conveying line.

According to a further preferred embodiment of the invention, movement of the transverse slide takes place by means of the work cycle guiding path in the form of a cam track.

According to a further preferred embodiment, the guiding element is in the form of a guiding wheel which is guided in a rolling manner along the link guide.

A further expedient embodiment of the invention is characterised in that the work cycle guiding path and the return guiding path of the link guide form guiding recesses in which the guiding wheel is guided.

According to a further preferred embodiment of the invention, the guiding wheel, in the respective transition regions between the work cycle guiding path and the return guiding path, runs in the respective guiding recesses at least substantially without guiding.

A further expedient embodiment of the invention is characterised by pivoting of guide elements pivotably arranged in the guiding recess, namely a first guide element, which is arranged on the starting position side in the region of the transition from the return guiding path to the work cycle guiding path, and a second guide element, which is arranged on the end position side in the region of the transition from the work cycle guiding path to the return guiding path.

A further expedient embodiment is characterised by pivoting of the first and second guide elements out of and into the path plane of the guiding recesses.

A preferred further development of the invention is characterised by pivoting of a return guiding path blocking element of the first guide element out of the path plane of the guiding recess of the return guiding path during the return cycle as the guiding element passes, in order to allow the guiding element to pass, and pivoting of at least the return guiding path blocking element into the path plane of the guiding recess of the return guiding path after the guiding element has passed, in order to block the return guiding path for passage of the guiding element during the work cycle.

A further expedient embodiment of the invention is characterised in that the pivoting out of the path plane takes place in that the guiding element comes into contact with a ramp-like first guiding element sensing part, which widens in the conveying direction, of the return guiding path blocking element, so that the return guiding path blocking element is pivoted out of the path plane and, for blocking the return guiding path during the work cycle, a work cycle guiding path part of the return guiding path blocking element forms at least a first wall section of the work cycle guiding path.

A further expedient embodiment of the invention is characterised by pivoting of a work cycle guiding path blocking element of the second guide element out of the path plane of the work cycle guiding path during the work cycle as the guiding element passes, in order to allow the guiding element to pass, and pivoting of at least the work cycle guiding path blocking element into the path plane of the work cycle guiding path after the guiding element has passed, in order to block the work cycle guiding path for passage of the guiding element during the return cycle.

A preferred further development of the invention is distinguished in that the pivoting out of the path plane takes place in that the guiding element comes into contact with a ramp-like second guiding element sensing part, which widens in the conveying direction, of the work cycle guiding path blocking element, so that the work cycle guiding path blocking element is pivoted out of the path plane and, for blocking the work cycle guiding path during the return cycle, a work cycle guiding path part of the work cycle guiding path blocking element forms at least a second wall section of the return guiding path.

According to a further preferred embodiment of the invention, the first guide element and the second guide element pivot back into the path plane automatically.

According to a further preferred embodiment, the automatic pivoting back is effected by restoring means arranged on the first guide element and/or on the second guide element.

A further expedient embodiment of the invention is characterised in that the oscillating driving of the longitudinal slide takes place via a coupling rod which is coupled with a continuously circulating belt drive or chain drive which drives a conveyor chain on which the receiving elements of the conveyor device are arranged.

A further expedient embodiment of the invention is characterised by spring-pretensioning of a longitudinal slide spring unit, which acts between the longitudinal slide and the carrier element and is part of the positioning unit, when a predefined return position of the longitudinal slide is reached during a return cycle.

A preferred further development of the invention is distinguished in that the spring-pretensioning of the longitudinal slide spring unit is effected by means of at least one longitudinal spring element which is arranged on one side on the carrier element and the one free longitudinal spring element side of which comes into mechanical contact with a longitudinal counter-surface element arranged on the longitudinal slide when the predefined return position is reached.

An expedient embodiment of the invention is characterised in that the spring-pretensioning of the longitudinal slide spring unit is effected by means of the at the least one longitudinal spring element which is arranged on one side on the longitudinal slide and the one free longitudinal spring element side of which comes into mechanical contact with a longitudinal counter-surface element arranged on the carrier element when the predefined return position is reached.

A further expedient embodiment of the invention is characterised by spring-pretensioning of a transverse slide spring unit, which acts between the transverse slide and the longitudinal slide, when a predefined deflected position of the transverse slide is reached.

An expedient embodiment of the invention is characterised in that the spring-pretensioning of the transverse slide spring unit is effected by means of at least one transverse spring element which is arranged on one side on the longitudinal slide and the one free transverse spring element side of which comes into mechanical contact with a transverse counter-surface element arranged on the transverse slide when the predefined deflected position is reached.

According to a further preferred embodiment, the spring-pretensioning of the transverse slide spring unit is effected by means of the at least one transverse spring element which is arranged on one side on the transverse slide and the one free transverse spring element side of which comes into mechanical contact with a transverse counter-surface element arranged on the longitudinal slide when the predefined deflected position is reached.

According to a further preferred embodiment of the invention, the position of the carrier element is adjustable transverse to the conveying direction.

The invention relates further to a method for removing the wishbone from poultry carcasses, characterised by carrying out the steps of the method for the moving-along tool positioning of linearly conveyed articles, wherein the articles are poultry carcasses, in each case one of the poultry carcasses is held by means of the receiving elements with its neck side facing the processing station, and the wishbone of the poultry carcass is removed by means of the at least one processing tool, which is in the form of a wishbone removal unit.

BRIEF DESCRIPTION OF THE DRAWINGS

Further preferred and/or expedient features and embodiments of the invention will become apparent from the description. Particularly preferred embodiments will be explained in greater detail with reference to the accompanying drawings, in which.

DETAILED DESCRIPTION OF THE INVENTION

The preferred embodiments of the assembly according to the invention and of the apparatus will be described in greater detail with reference to FIG. 1 to 16 described hereinbelow. In order to avoid repetition, this description will also serve to explain the method according to the invention in greater detail. The method according to the invention will be discussed in greater detail only when the respective method steps are not analogous to the apparatus or assembly according to the invention.

Figure 1:
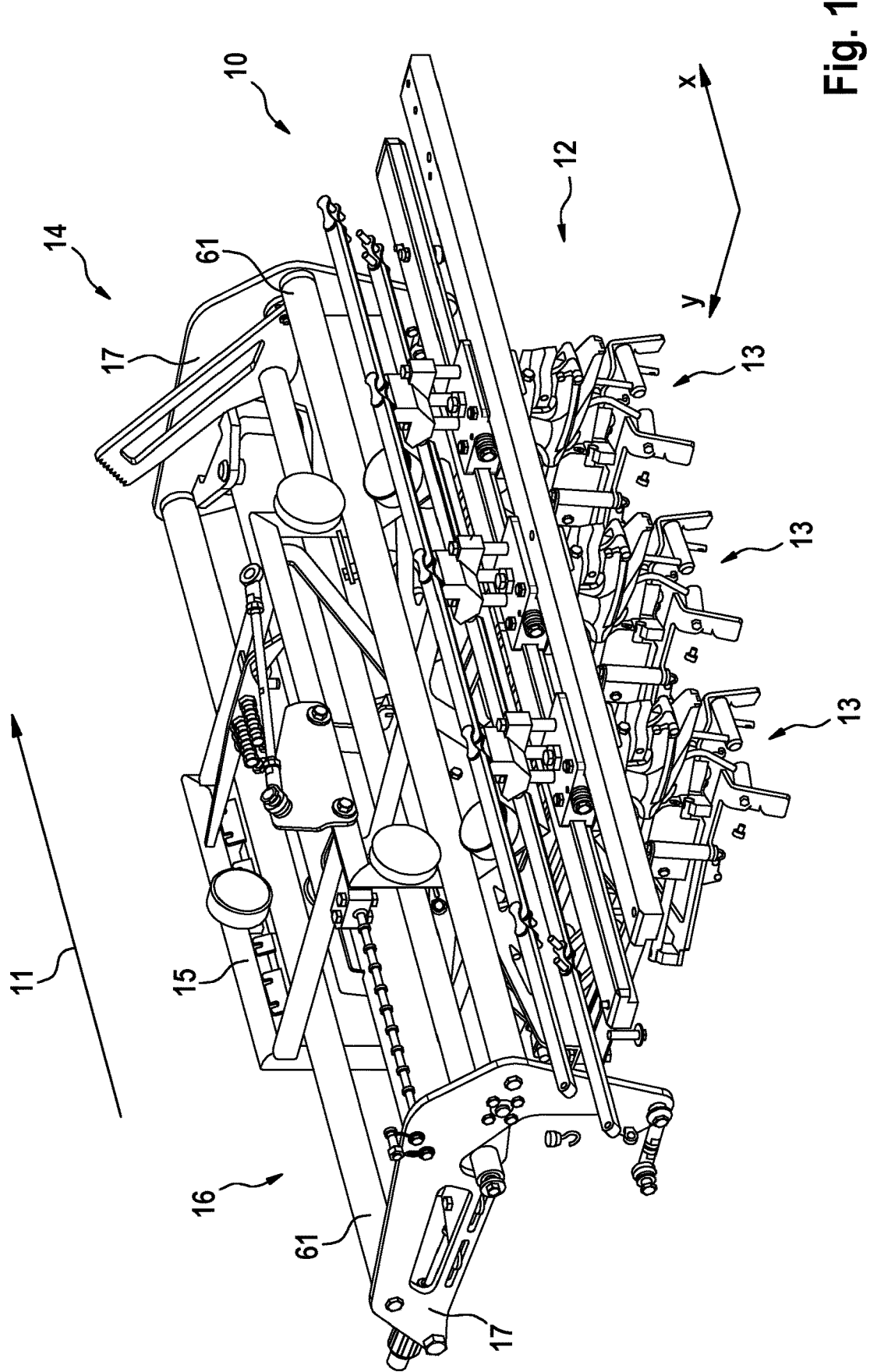
FIG. 1 is a perspective view of the assembly according to the invention.
Figure 2:
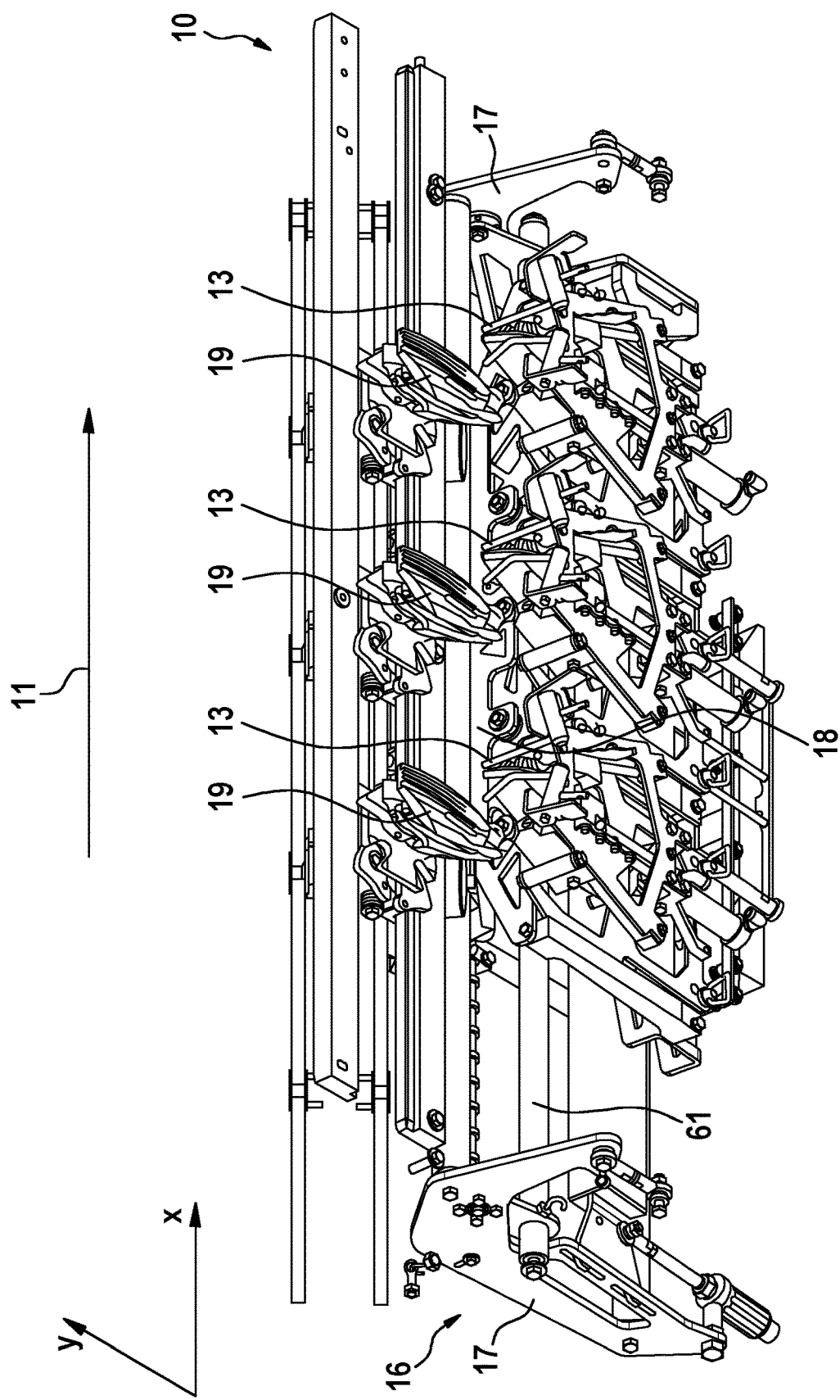
FIG. 2 is a perspective view of the assembly shown in FIG. 1, looking at the underside.

FIG. 1 is a perspective view of the assembly according to the invention. The assembly comprises an apparatus for the moving-along tool positioning of linearly conveyed articles. This apparatus according to the invention comprises a conveyor device 10, which forms a conveying line. The articles—not shown in FIG. 1—are conveyed in a conveying direction 11. For this purpose, the conveyor device 10 has a plurality of receiving elements 19—shown in FIG. 2—which are adapted to hold the articles. By way of example, the receiving elements 19 shown in FIG. 2 are here in the form of receiving saddles for holding poultry carcasses. The apparatus according to the invention is of course not limited solely to the processing of poultry carcasses. The representation chosen in FIG. 2 serves merely for illustrative purposes and to explain the assembly according to the invention. In principle, the apparatus according to the invention is suitable for the processing of any articles, provided that the receiving elements 19 are in each case correspondingly adapted to those articles.

Along the conveying line there is arranged at least one processing station 12, which comprises processing tools 13 adapted to process the articles. In the drawing, a processing station 12 with three processing tools 13 is shown by way of example. The number of processing stations 12 can in principle be chosen freely as required.

The processing station 12 has a positioning unit 14 adapted to position the at least one processing tool 13. The positioning unit 14 comprises a longitudinal slide 15. The longitudinal slide is arranged on a carrier element 16 so as to be slidable in and contrary to the conveying direction 11. The carrier element 16 is formed by two side parts 17 and at least two drive elements 61. The longitudinal slide 15 is guided in the conveying direction 11 by means of the drive elements 61. The drive elements 61 form with the side parts 17 the carrier element 16, which is thus of frame-like form.

FIG. 2 shows a transverse slide 18, which is arranged on the longitudinal slide 15 so as to be slidable transverse to the conveying direction 11. In this manner, it is possible to position the transverse slide transverse to the conveying direction 11, that is to say in the y-direction, and the longitudinal slide in the conveying direction, that is to say in the x-direction.

Figure 6:
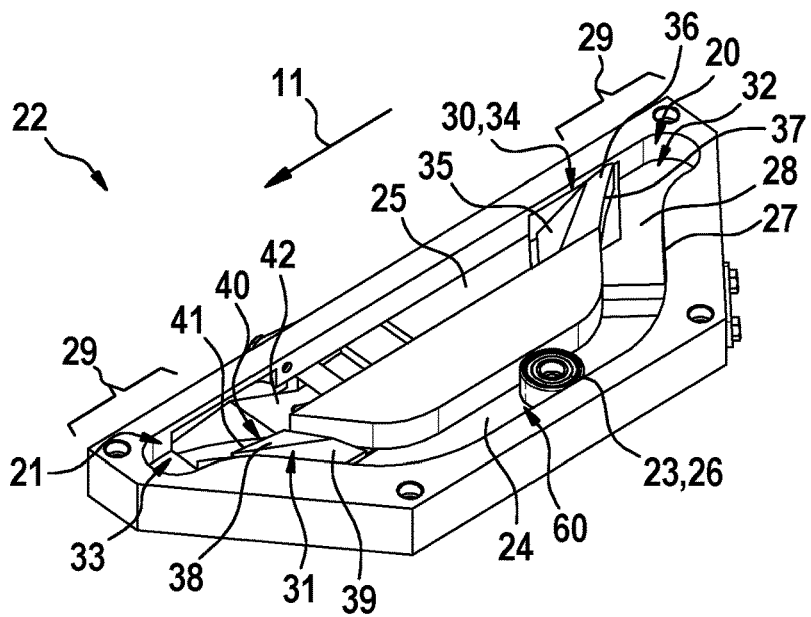
FIG. 6 is a perspective detail view of the link guide during the work cycle.
Figure 12:
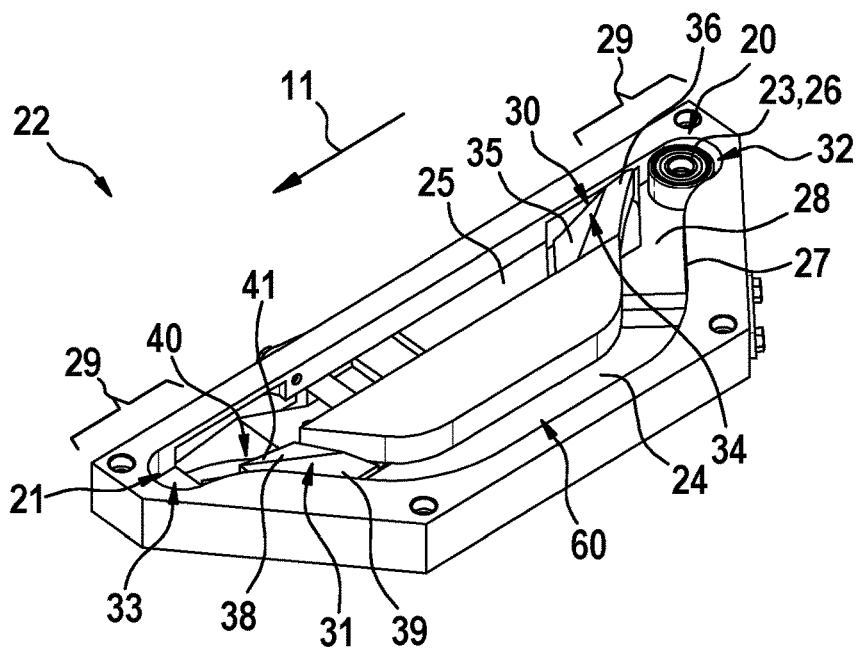

The longitudinal slide 15 is driven in an oscillating manner such that the longitudinal slide 15 on the one hand, in a work cycle, moves along asynchronously with the receiving elements 19 in the conveying direction 11 from a starting position 20—shown in FIG. 12—into an end position 21—shown in FIG. 6. Furthermore, the drive—not shown in the drawing—is configured such that the longitudinal slide 15, in a return cycle, moves contrary to the conveying direction from the end position 21 back into the starting position 20.

FIG. 6 to 12 show a stationarily arranged link guide 22, into which a guiding element 23 of the transverse slide 18 engages. The link guide 22 is therefore configured to move the transverse slide 18, during the work cycle, transverse to the conveying direction 11 from a standby position towards the receiving elements 19 into a working position 60 and from the working position 60 back into the standby position. The sequence is shown indirectly in FIG. 6 to 12 by means of the respective positions of the guiding element 23. Furthermore, the link guide 22 is adapted to guide the transverse slide 18, during the return cycle, transverse to the conveying direction 11 without deflection. This movement sequence is again shown indirectly and schematically in FIG. 9 to 12 by means of the positions of the guiding element 23.

As is shown in FIG. 6 to 12, the link guide 22 preferably comprises at least a work cycle guiding path 24 and a return guiding path 25. The return guiding path 25 is oriented parallel to the conveying line and extends linearly parallel thereto. The work cycle guiding path 24 extends, starting from the return guiding path 25, from the starting position 20 and the end position 21 to the working position 60 of the longitudinal slide. In other words, the work cycle guiding path 25 is so configured that it leads towards its centre in the direction of the receiving elements 19 transverse to the conveying direction 11 in order to effect the deflection of the transverse slide 18.

Particularly preferably, the work cycle guiding path 24 is in the form of a cam track 27. For example, the cam track 27, as shown in the drawing, is in the form of a double S-curve, the maximum deflection of which in the direction transverse to the conveying direction 11 is at the centre of the cam track 27. In particular, the cam track 27 is free of steps. The cam track 27 therefore does not have any points of discontinuity. The cam track 27 is consequently free of jump points.

The guiding element 23 is preferably in the form of a guiding wheel 26. The guiding wheel 26 is thus guided by means of the cam track 27 with as little friction as possible. In particular, the guiding wheel 26 has ball bearings or is in the form of a ball bearing.

The work cycle guiding path 24 and the return guiding path 25 of the link guide are each in the form of guiding recesses 28 and are configured to guide the guiding element 23 or guiding wheel 26. Preferably, the guiding recesses 28 of the work cycle guiding path 24 and of the return guiding path 25 merge into one another and thus form a closed guiding path.

Preferably, the guiding recesses 28 have a predetermined excess relative to the guiding wheel 26 at the respective transition regions 29 between the work cycle guiding path 24 and the return guiding path 25. This has the advantage that the guiding wheel 26 is not mechanically limited in the respective guiding recess 28 in particular at the reversal points of the to and fro movement of the longitudinal slide 15 and at the reversal points of the to and fro movement of the transverse slide 18. Thus, abrupt slowing of the movement sequence and mechanical loads which would otherwise be high and act in a pulse-like manner are avoided and, overall, a low-vibration movement sequence is made possible.

Advantageously, a first pivotable guide element 30 and a second pivotable guide element 31 are each arranged on the guiding recesses 28. The first guide element 30 is arranged on the starting position side in the region of the transition 32 from the return guiding path 25 to the work cycle guiding path 24. The second guide element 31 is arranged on the end position side in the region of the transition 33 from the work cycle guiding path 24 to the return guiding path 25. In other words, the guide elements 30, 31 are each arranged at the end of the path.

Figure 7:
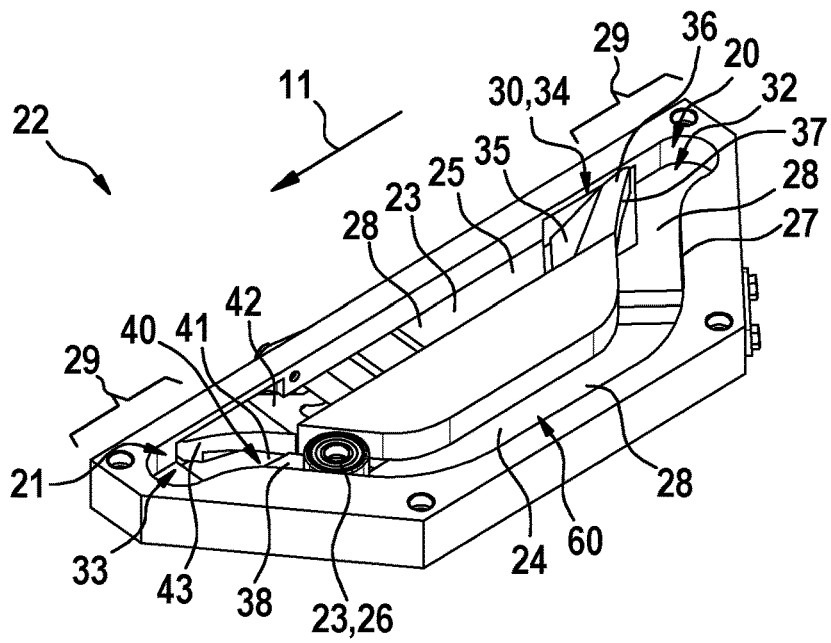
FIG. 7 to 9 show the link guide shown in FIG. 6 with different positions of the guiding wheel during transfer from the work cycle guiding path into the return guiding path.
Figure 8:
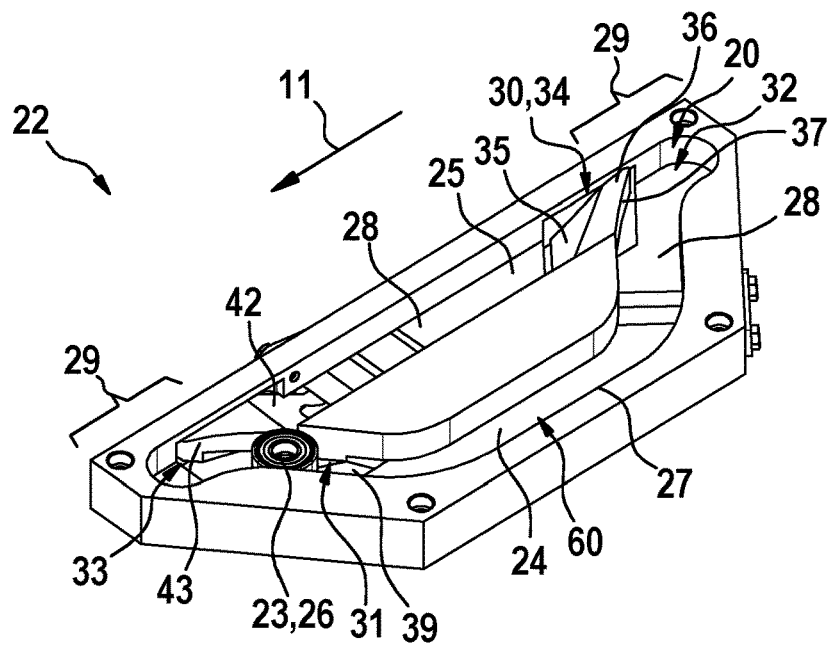
Figure 9:
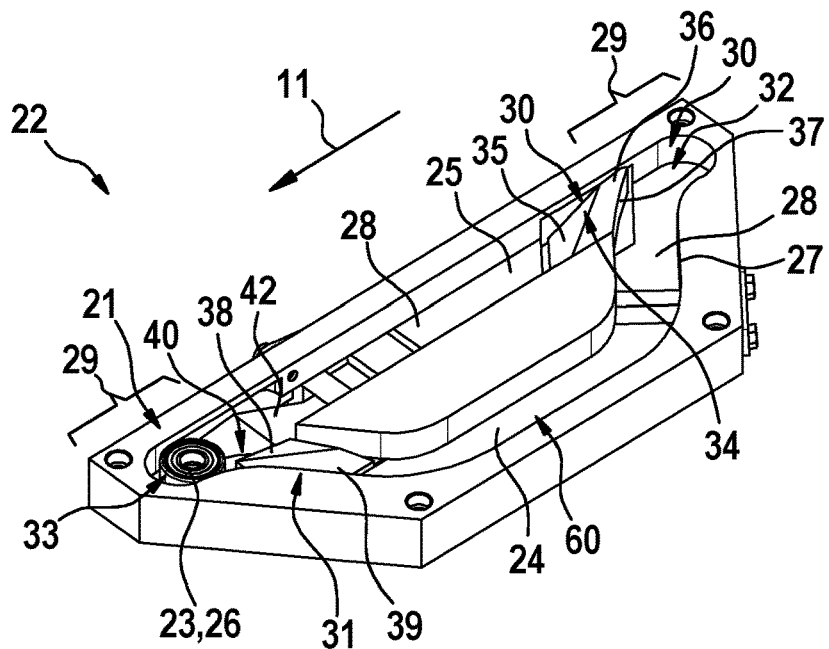
Figure 10:
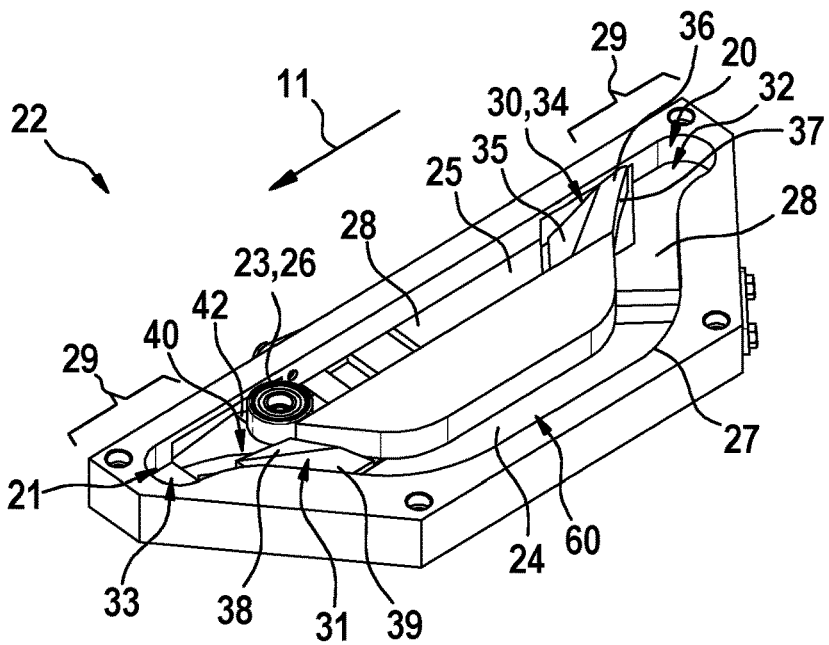
FIG. 10 to 12 show the link guide shown in FIG. 6 with different positions of the guiding wheel during transfer from the return guiding path into the work cycle guiding path.
Figure 11:
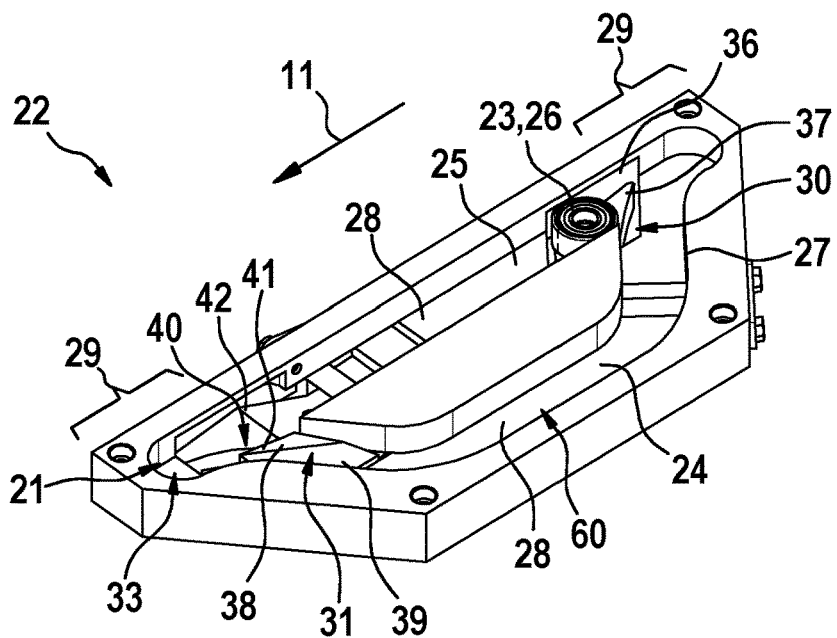

The first and second guide elements 30, 31 are each arranged so that they can be pivoted out of and into the path plane of the guiding recesses 28. The guide elements 30, 31 are thus arranged such that they project into the guiding recess 28 and at least—in the pivoted-in state—extend at least over part of the height of the guiding recesses 28, for example as shown in FIGS. 9, 10 and 12. As is shown in FIGS. 7, 8 and 11, the guide elements 30, 31—as described in detail hereinbelow—can be pivoted out of the mentioned path plane so that the guiding recess 28 becomes free at the respective guide element position for the passage of the guiding element 23 or guiding wheel 26. In this manner, the first and second guide elements 30, 31 each form a switch element which is adapted to ensure reliable transfer of the guiding element 23 from the return guiding path 25 into the work cycle guiding path 24 and vice versa.

Advantageously, the first guide element 30 comprises a return guiding path blocking element which is configured and adapted to allow the guiding element 23 or guiding wheel 26 to pass during the return cycle by pivoting out of the path plane of the return guiding path 25. This operation is shown in FIG. 11. After the guiding element 23 has passed, the return guiding path 25 is blocked for passage of the guiding element 23 during the work cycle by pivoting of at least the return guiding path blocking element 34 into the path plane of the guiding recess 28 of the return guiding path 25. This is illustrated in FIG. 12. The guiding element 23 has already passed the return guiding path blocking element 34, wherein the return guiding path blocking element 34 has been pivoted out of the path plane during passage of the guiding element 23. After it has pivoted back into the path plane, the return guiding path blocking element 34 prevents the guiding element 23 from entering and guides it into the work cycle guiding path 24, so that the guiding element is guided—as shown in FIG. 6—in the work cycle guiding path 24.

Preferably, the return guiding path blocking element 34 comprises a first guiding element sensing part 35 and a work cycle guiding path part 36. The first guiding element sensing part 35 is preferably of ramp-like form with a width that increases contrary to the conveying direction 11. The width of the guiding element sensing part 35 extends in the vertical direction of the guiding recess 28. The work cycle guiding path part 36 is adapted such that it forms at least a first wall section 37 of the work cycle guiding path 24. The functioning of the guiding element sensing part 35 and of the work cycle guiding path part 36 with its first wall section 37 is apparent in particular from FIGS. 11 and 12. FIG. 11 shows the passage of the guiding wheel 26, in which it slides over and beyond the ramp-like guiding element sensing part 35, wherein the guiding element sensing part is pivoted out of the path plane—downwards in the drawing. The first guide element 30 then returns to the starting position automatically. This state is shown in FIG. 12. The first wall section 37 then forms part of the work cycle guiding path 24.

Further preferably, the second guide element 31 comprises a work cycle guiding path blocking element 38 which is configured and adapted to allow the guiding element 23 to pass during the work cycle by pivoting out of the path plane of the work cycle guiding path 24, as is shown by way of example in FIGS. 7 and 8. After the guiding element 23 has passed, the work cycle guiding path blocking element 38 pivots into the path plane of the guiding recess 28 of the work cycle guiding path 24, so that the work cycle guiding path 24 is blocked for passage of the guiding element 23 during the return cycle, as is shown by way of example in FIG. 9.

The work cycle guiding path blocking element 38 comprises a second guiding element sensing part 39 and a return guiding path part 40. The second guiding element sensing part 39 is preferably of ramp-like form with a width that increases in the conveying direction 11 relative to its height in the guiding recess 28, while the return guiding path part 40 forms at least a second wall section 41 of the return guiding path 25.

The fundamental mode of functioning is shown in FIG. 6 to 9. The guiding wheel 26 is guided in the work cycle guiding path 24 (FIG. 6). In FIGS. 7 and 8, it is shown by way of example how the guiding wheel 26 comes into contact with the guiding element sensing part 39 and slides over and beyond it, while the guiding element sensing part pivots out of the path plane—downwards in the drawing. The passage for the guiding wheel 26 is thus free. After the guiding element sensing part 39 has been passed, it pivots back into the path plane, as is shown by way of example in FIG. 9. The return guiding path part 41 then forms, with its second wall section 40, a barrier which reliably prevents the guiding element 23 or guiding wheel 26 from entering the work cycle guiding path 24 contrary to the conveying direction 11 and guides it into the return guide path 25.

FIG. 6 to 12 show a further advantageous embodiment of the invention. A further, third guide element 42 is optionally shown in the return guiding path 25. This guide element 42 is likewise adapted to be pivotable out of the path plane. In contrast to the first and second guide elements 30, 31, however, this guide element is mechanically coupled with the second guide element 31 such that, when the second guide element 31 is pivoted out of the path plane, the third guide element 33 is pivoted into the path plane. In this pivoted-in state, as is shown by way of example in FIGS. 7 and 8, the guide element 33 forms a third wall section 43 of the work cycle guiding path 24.

After the guiding element 23 or guiding wheel 26 has passed and the second guide element 31 has pivoted back into the path plane, the third guide element 42—as is shown by way of example in FIG. 9—is at the same time pivoted out of the path plane of the return guiding path 25 by the mechanical coupling, so that the guiding recess 28 becomes free for the passage of the guiding element 23 or guiding wheel 26.

Preferably, the first guide element 30 and the second guide element 31 are configured such that they pivot back into the path plane automatically. According to the preferred embodiment with the third guide element 42, this likewise affects the mechanical coupling of the second guide element 31 with the third guide element 42. In this case, the second guide element 31 is so adapted that it pivots back into the path plane automatically, while the third guide element 42 is pivoted out of the path plane.

According to a preferred embodiment of the invention, restoring means—not shown in the drawing—are arranged on the first guide element 30, the second guide element 31 and/or the third guide element 42 and are adapted to pivot the guide elements back into the path plane automatically. There are used as restoring means, for example, tension or compression springs or pneumatic cylinders.

Preferably, the conveyor device 10 comprises a conveyor chain—not shown in the drawing—on which the receiving elements 19 are arranged. The conveyor device 10 further comprises a drive—not shown in the drawing—which is adapted to drive the conveyor chain. This drive comprises at least one continuously circulating belt drive or chain drive with which the longitudinal slide 15 is coupled by means of a coupling rod. Thus, on the one hand rigid synchronisation of the movement of the longitudinal slide movement is achieved and at the same time the oscillating to and fro movement of the longitudinal slide 15 in and contrary to the conveying direction 11 is effected.

Figure 13:
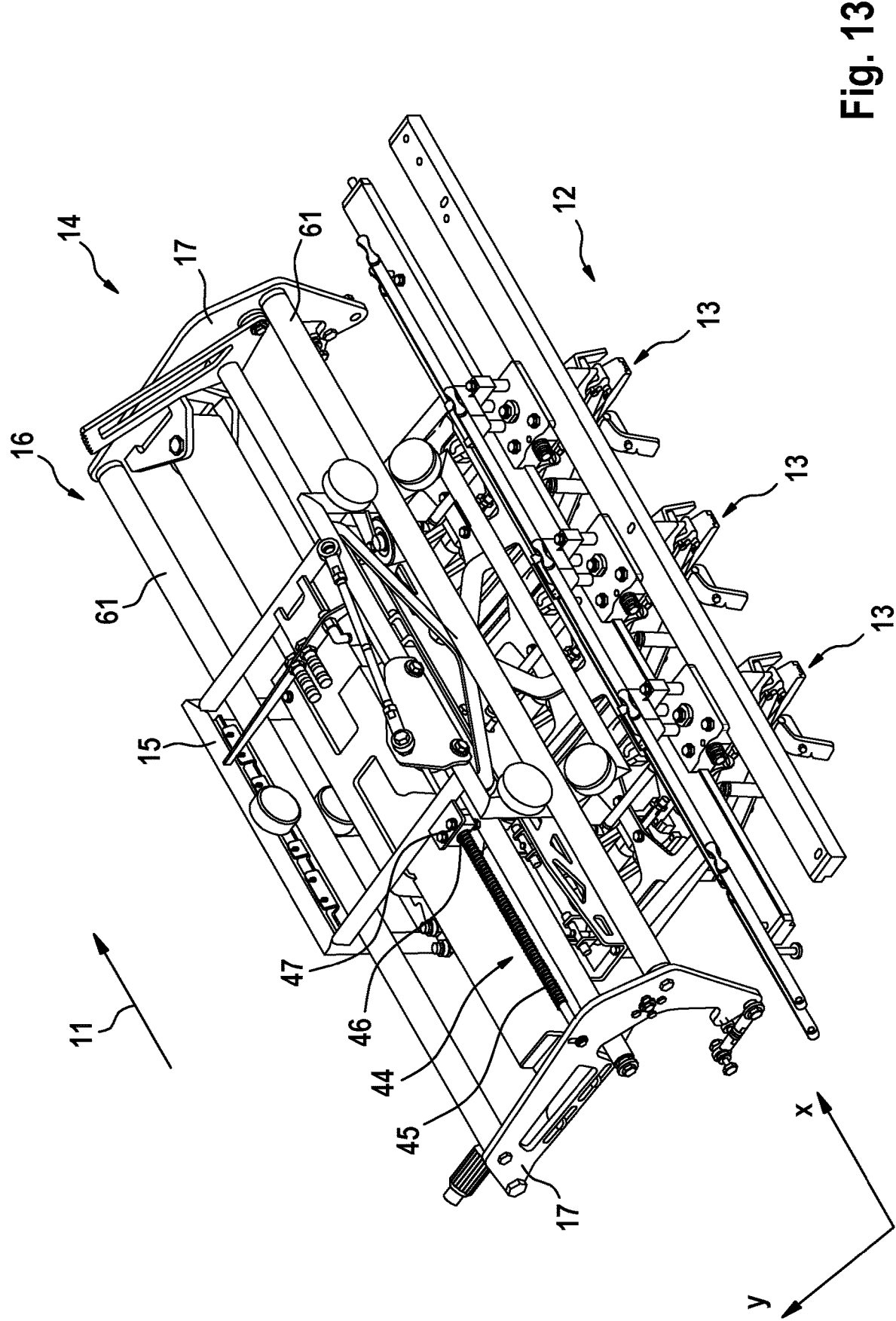
FIG. 13 is a perspective view of the assembly according to the invention, looking at the longitudinal slide spring unit.
Figure 14:
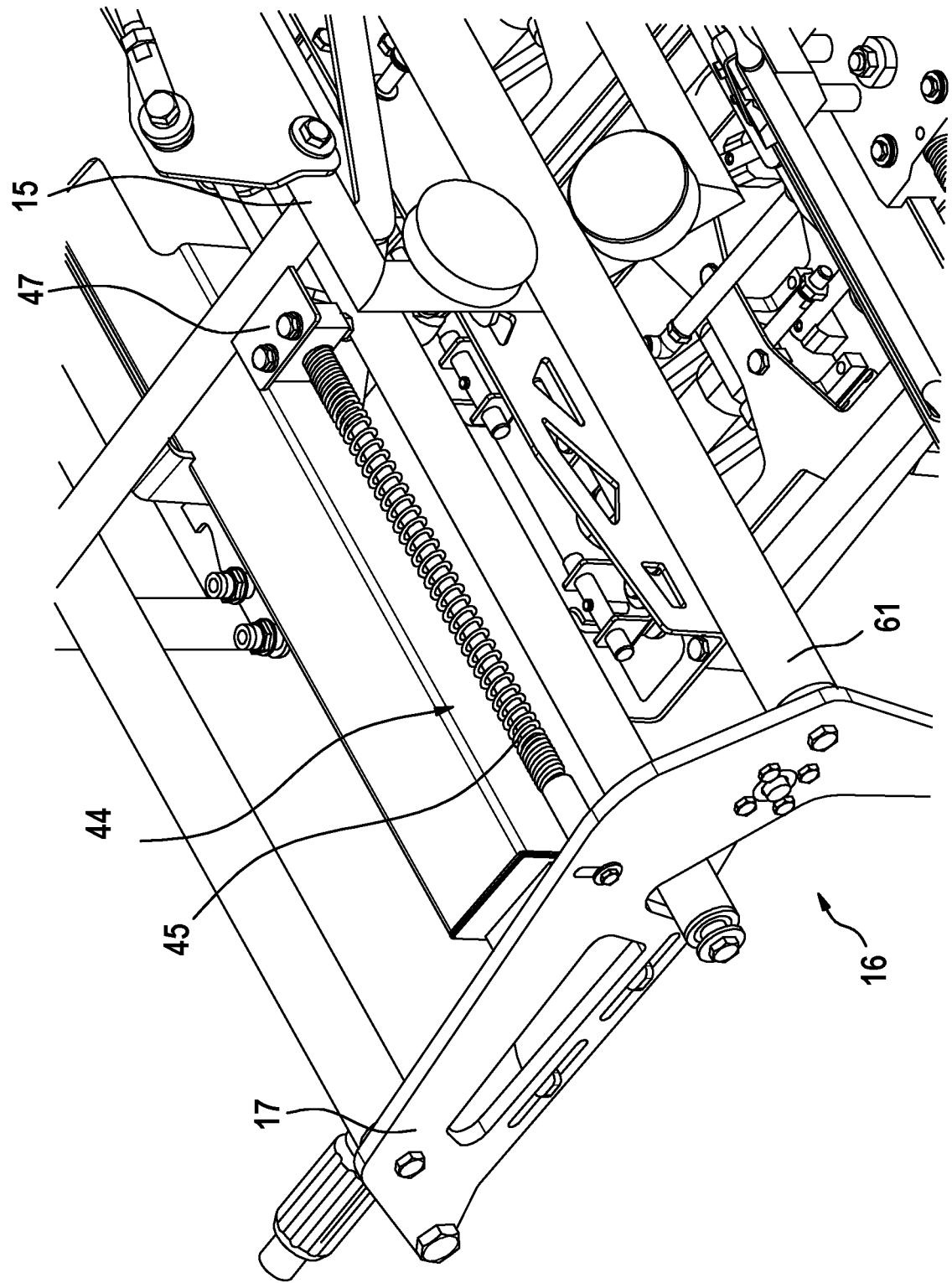
FIG. 14 shows the assembly shown in FIG. 13 with a detail view of the longitudinal spring element.

As is shown in FIG. 13, the positioning unit 14 comprises a longitudinal slide spring unit 44. The longitudinal slide spring unit 44 is configured to be spring-pretensioned between the longitudinal slide 15 and the carrier element 16 when a predefined return position of the longitudinal slide 15 during a return cycle is reached. FIG. 13 shows by way of example how the longitudinal slide spring unit 44 is already partially pretensioned. Particularly preferably, the predefined return position is located at approximately ⅓ of the total return distance. In this first third of the distance, the longitudinal slide spring unit 44 is not in engagement with the longitudinal slide 15. Thereafter, the longitudinal slide spring unit 44 is spring-pretensioned in a sliding manner. An enlarged detail view of the longitudinal slide spring unit 44 shown in FIG. 13 is shown in FIG. 14.

As is shown by way of example in FIG. 13, the longitudinal slide spring unit 44 comprises at least one longitudinal spring element 45. The longitudinal spring element 45 is optionally—not shown in the drawing—arranged on one side on the carrier element 16. A free longitudinal spring element side 46 is adapted to come into mechanical contact with a longitudinal counter-surface element 47 arranged on the longitudinal slide 15 when the predefined return position is reached.

Optionally, the longitudinal slide spring unit 44—as is shown in FIG. 13—comprises at least the one longitudinal spring element 45 which is arranged on one side on the longitudinal slide 15 and the free longitudinal spring element side 46 of which is adapted to come into mechanical contact with the longitudinal counter-surface element 47 arranged on the carrier element 16 when the predefined return position is reached. As is shown in the drawing, the at least one longitudinal spring element 45 is in the form of a compression spring. Alternatively, the longitudinal spring element 45 is in the form of a tension spring.

Figure 15:
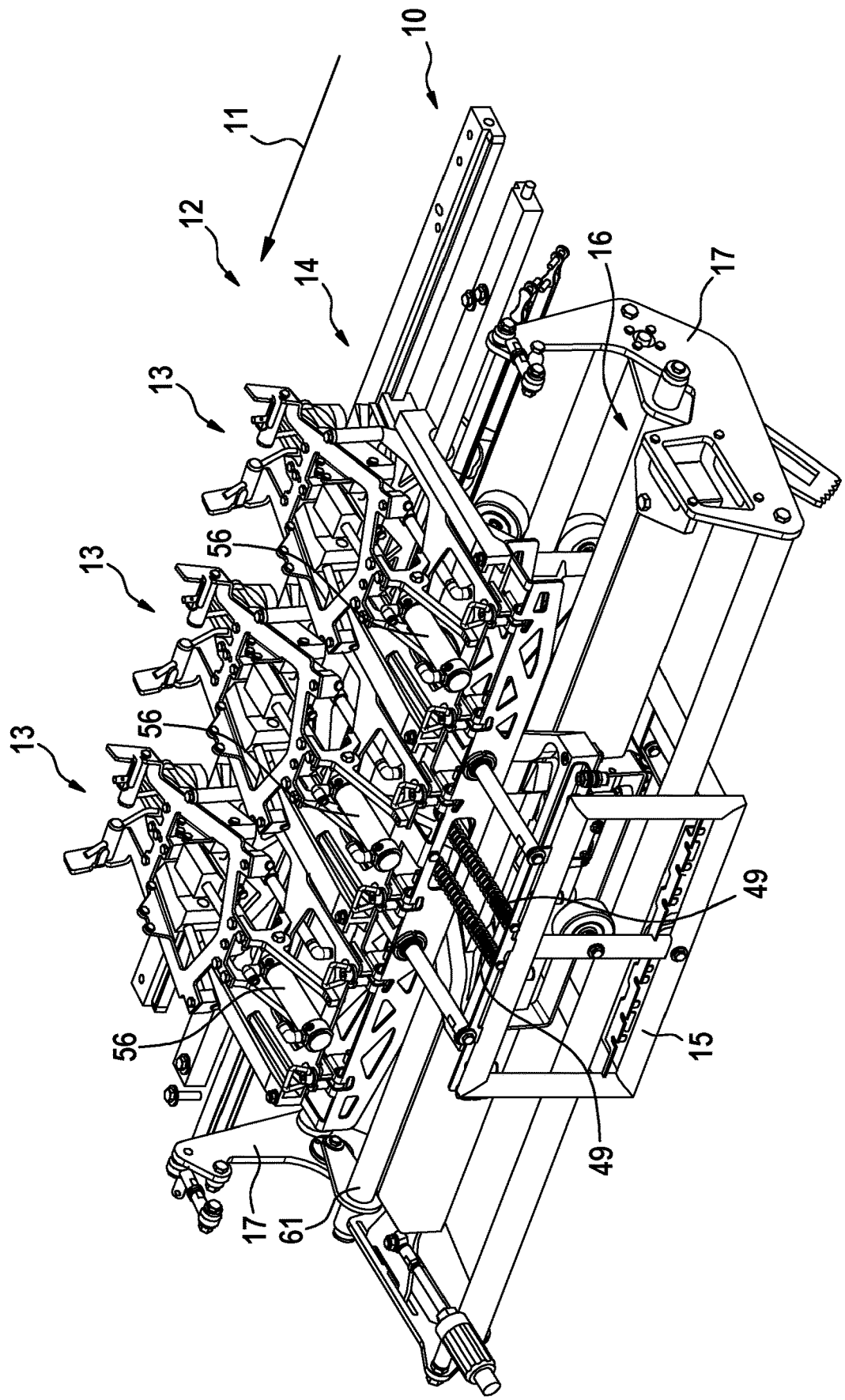
FIG. 15 is a perspective view of the assembly according to the invention, looking at the transverse slide spring unit.

FIG. 15 shows the positioning unit 14, which comprises a transverse slide spring unit 48. This is configured and adapted to be spring-pretensioned between the transverse slide 18 and the longitudinal slide 15 when a predefined deflected position of the transverse slide 18 is reached during a work cycle.

Figure 16:
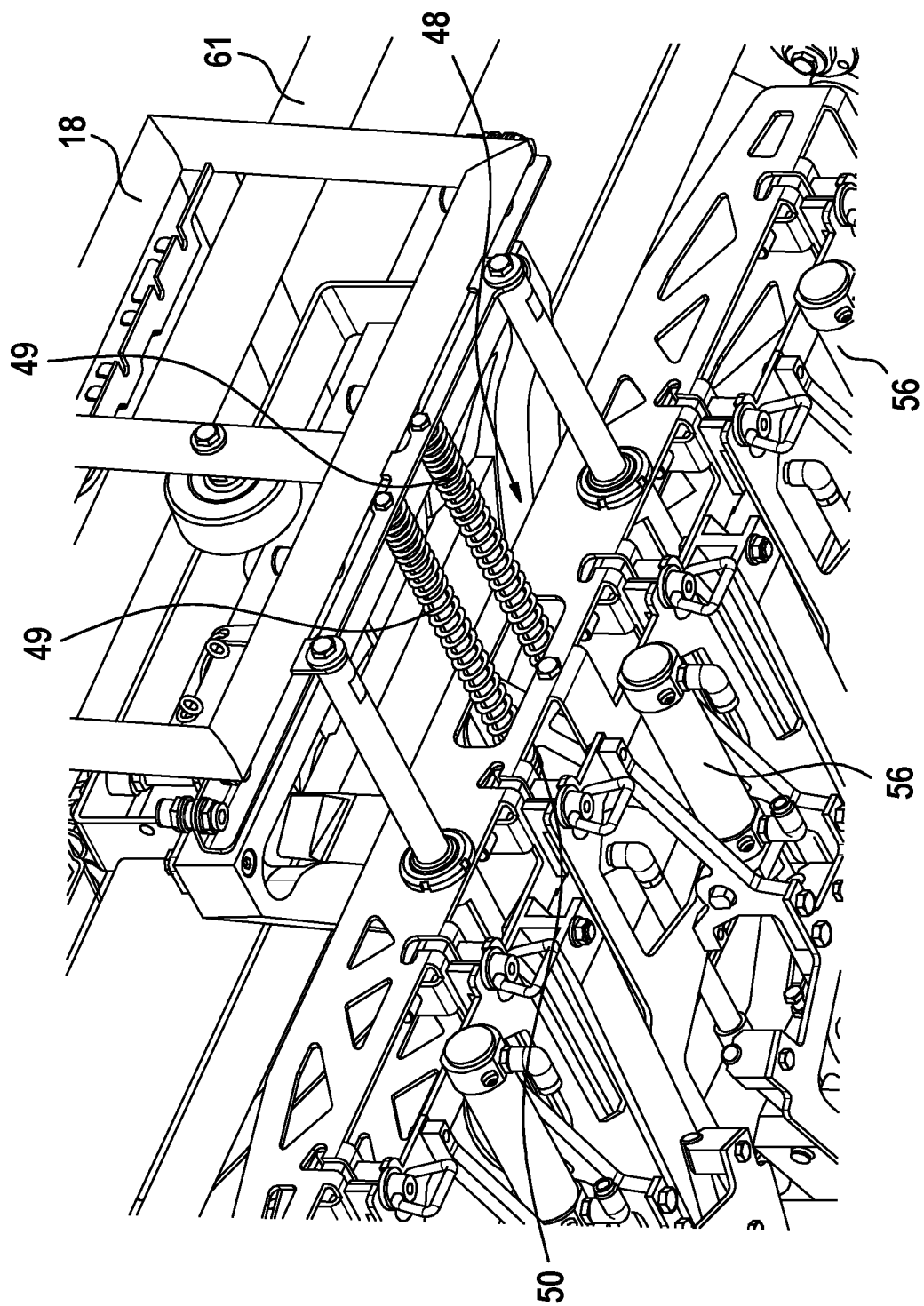
FIG. 16 is a detail view of the assembly shown in FIG. 15, looking at the transverse spring element.

FIG. 16 shows an enlarged detail view of the transverse slide spring unit 48 shown in FIG. 15. Preferably, the transverse slide spring unit 48 comprises at least one transverse spring element 49, in particular two of the transverse spring elements 49. The at least one transverse spring element 49 is arranged on one side on the longitudinal slide 15. Its one free transverse spring element side 50 is adapted to come into mechanical contact with a transverse counter-surface element—not visible in the drawing—arranged on the transverse slide 18 when the predefined deflected position is reached. The functioning of the transverse slide spring unit 48 is identical with that of the longitudinal slide spring unit 44. The advantages and modes of functioning mentioned there also apply to the transverse slide spring unit 48 according to the invention. Preferably, the transverse slide 18 is arranged inclined relative to the horizontal such that a movement of the transverse slide 18 towards the processing tools 13 is adapted to be assisted by gravity. In other words, the transverse slide 18 is arranged so that it is inclined downwards towards the processing tools 13.

Alternatively, the at least one transverse spring element 49 is arranged on one side on the transverse slide 18. Its one free transverse spring element side is adapted to come into mechanical contact with the transverse counter-surface element arranged on the longitudinal slide 15 when the predefined deflected position is reached. Preferably, the transverse spring element(s) 49—as shown in the drawing—is/are in the form of compression spring(s). It is, however, also possible to configure them as tension springs. The articulation of the transverse spring element 49 is then to be adapted accordingly.

Preferably, the carrier element 16 is adapted to be adjusted in terms of its position transverse to the conveying direction 11. In this manner, the zero position of the processing tools 13 relative to the receiving elements 19 can be adjusted optimally. The carrier element 16 has for this purpose, for example, threaded bores—not shown in the drawing—through which stationarily arranged threaded rods are guided. The position adjustment takes place by turning the threaded rods.

The present invention is suitable in particular for removing the wishbone from poultry carcasses. The present invention therefore also includes an assembly for removing the wishbone from poultry carcasses. This assembly comprises the above-described apparatus according to the invention, wherein the articles are poultry carcasses, the receiving elements 19 are adapted to hold in each case one of the poultry carcasses with its neck side facing the processing station 12, and the at least one processing tool 13 is in the form of a wishbone removal unit 51.

Figure 3:
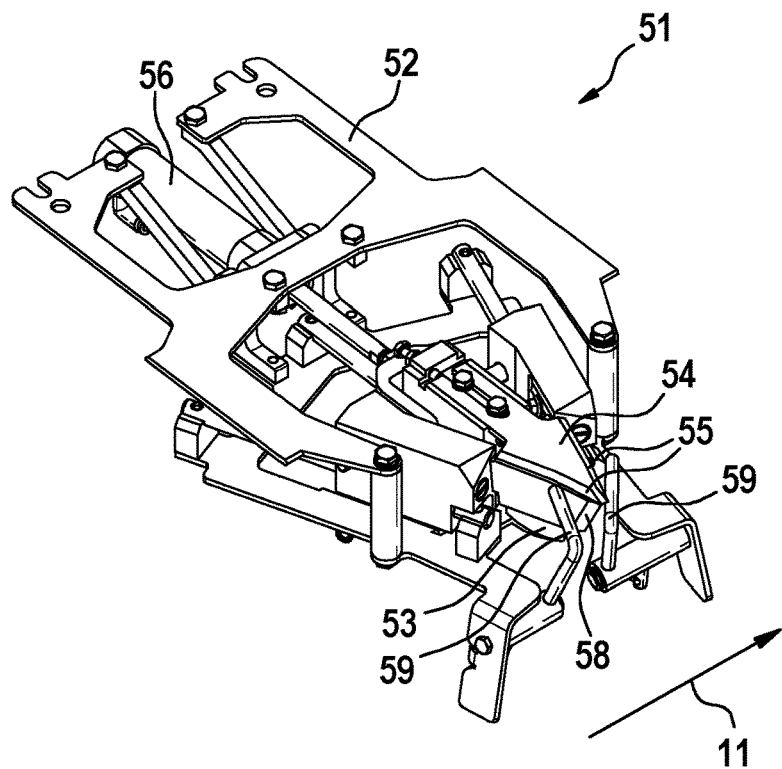
FIG. 3 is a perspective view of a wishbone removal unit.

FIG. 3 shows a perspective view of such a wishbone removal unit 51. On a supporting frame 52 there are slidably arranged two outer separating elements 53 and a double separating element 54 with two cutting edges 55 which is located therebetween.

Figure 4:
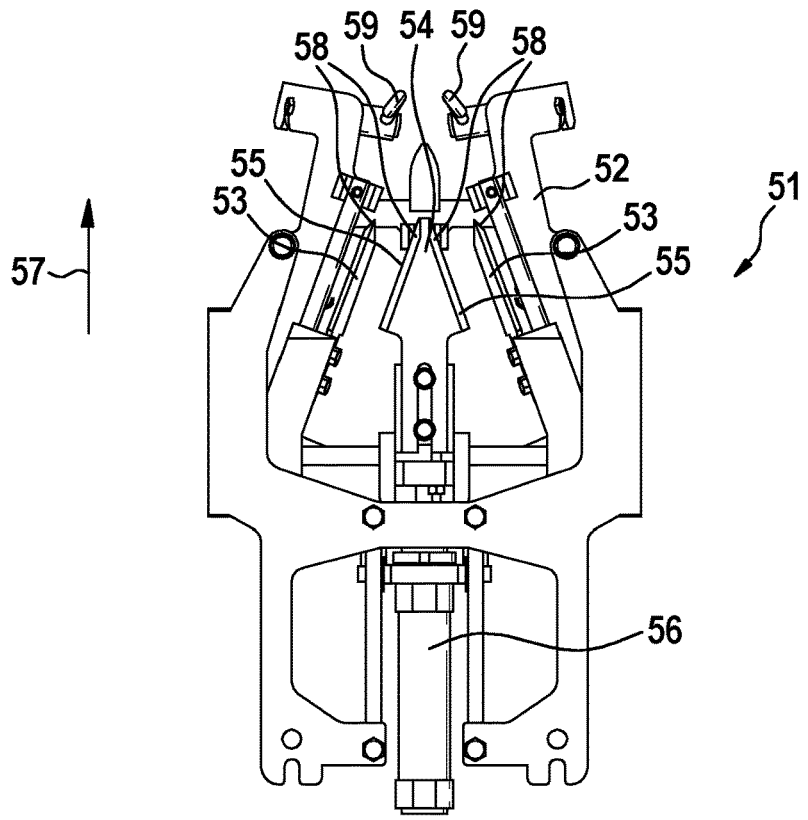
FIG. 4 is a plan view of the wishbone removal unit shown in FIG. 3, looking from beneath, in which the tools are in a standby position.

FIG. 4 shows the separating elements 53 and the double separating element 54 in a standby position, in which they are at the greatest possible distance from the receiving elements 19 and thus from the poultry carcasses—not shown in the drawing—to be processed.

Figure 5:
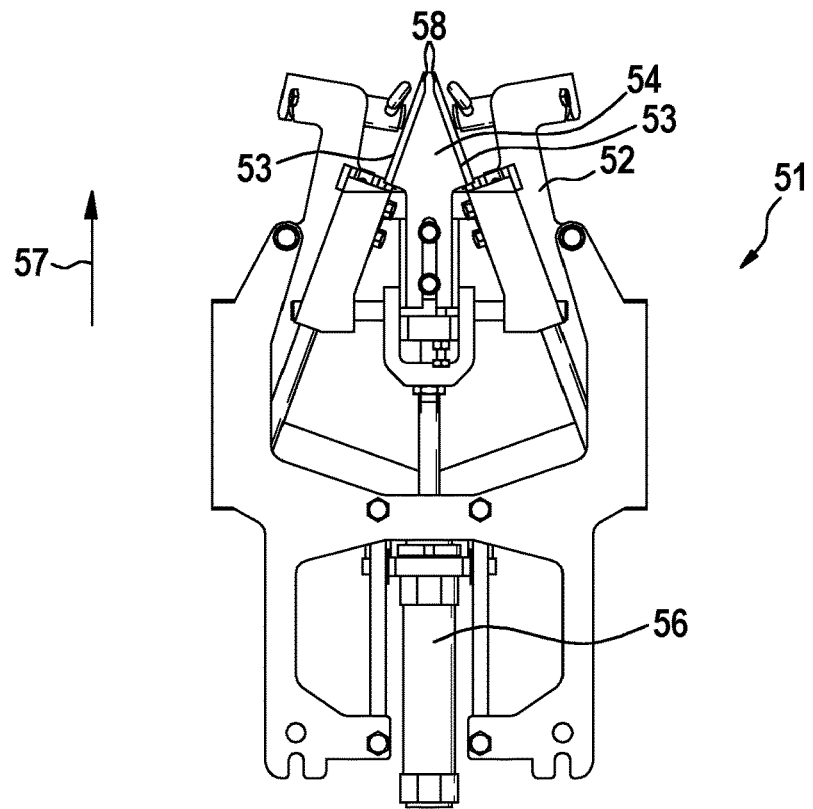
FIG. 5 is a plan view of the wishbone removal unit shown in FIG. 3, looking from beneath, in which the tools are in a processing position.

For detaching and/or removing the wishbone, the separating elements are displaced, as shown in FIG. 5, in a separating position by means of an actuator 56 transverse to the conveying direction 11, that is to say in the direction towards the receiving elements 19, namely in an infeed direction 57.

The separating elements 53 are each arranged inclined relative to the infeed direction 57 such that, in the separating position, their free ends 58 meet or nearly meet, in particular at an acute angle. The double separating element 54 is of arrow-like form and the separating elements 53 thereof are each oriented substantially parallel or parallel to the separating elements 53. Optional fillet guiding elements 59 serve to keep flesh regions away from the cutting path, in particular in order to displace the outer fillets to the side in the shoulder region so that the separating elements 52 can optimally remove the wishbone without coming into contact or colliding with the mentioned flesh regions.

As described hereinbefore, at least one of the above-described wishbone removal devices 51, as a processing tool 13, is part of the positioning device 14 according to the invention. The positioning device 14 is configured on the one hand to move all the wishbone removal devices 51 in the conveying direction 11 with the poultry carcasses to be processed and on the other hand, during the work cycle, to guide them transverse to the conveying direction 11 in the direction towards the receiving elements 19 to the poultry carcasses to be processed. By means of a control device—not shown in the drawing—the actuator 56, once the maximum deflection of the transverse slide 18 has been reached, is made to displace the separating elements 53 and the double separating element 54 from the standby position shown in FIG. 3 into the separating position. The positioning unit 14 according to the invention is therefore configured to pre-position the at least one wishbone removal device 51 by means of a general movement and thus bring it as close as possible to the poultry carcasses to be processed. The wishbone removal device 51 therefore has to perform only a comparatively small movement, namely bring the separating elements 53 and the double separating element 54 out of the standby position into the separating position. Owing to the above-mentioned advantages of the positioning unit 14 according to the invention, the wishbone removal devices 51 are thus pre-positioned with great speed and precision. The wishbone removal devices 51 themselves scarcely perform any infeed movement towards the receiving elements 19. Advantageously, the number of poultry carcasses that can be processed per unit of time can thus be increased significantly.

The invention claimed is:

1. An apparatus for the moving-along tool positioning of linearly conveyed articles, comprising
   a conveyor device forming a conveying line for conveying the articles in a conveying direction and having a plurality of receiving elements adapted to hold the articles;
   a processing station arranged along the conveying line and having at least one processing tool adapted to process the articles; wherein
   the processing station has a positioning unit adapted to position the at least one processing tool;
   wherein the positioning unit is formed by a longitudinal slide, which is slidable in the conveying direction relative to a carrier element, and a transverse slide, which is arranged on the longitudinal slide so as to be slidable transverse to the conveying direction,
   wherein the longitudinal slide is driven in an oscillating manner such that the longitudinal slide on the one hand, in a work cycle, moves along synchronously with the receiving elements in the conveying direction from a starting position into an end position and on the other hand, in a return cycle, moves contrary to the conveying direction from the end position back into the starting position, and
   wherein the transverse slide has at least one guiding element which engages into a stationarily arranged link guide, wherein the link guide on the one hand is adapted, during the work cycle, to move the transverse slide transverse to the conveying direction towards the receiving elements from a standby position into a working position and from the working position back into the standby position, and
   on the other hand is configured, during the return cycle, to guide the transverse slide transverse to the conveying direction without deflection.

2. The apparatus according to claim 1, wherein the link guide comprises at least a work cycle guiding path and a return guiding path, wherein the return guiding path is configured so as to extend linearly parallel to the conveying line and the work cycle guiding path extends, starting from the return guiding path, in each case from the starting position and the end position of the longitudinal slide to the working position.

3. The apparatus according to claim 2, wherein the work cycle guiding path is in the form of a cam track.

4. The apparatus according to claim 3, wherein the cam track is adapted to be free of steps.

5. The apparatus according to claim 1, wherein the guiding element is in the form of a guiding wheel.

6. The apparatus according to claim 5, wherein the work cycle guiding path and the return guiding path of the link guide are each in the form of guiding recesses in which the guiding wheel is guided.

7. The apparatus according to claim 6, wherein the guiding recesses have a predetermined excess relative to the guiding wheel in the respective transition regions between the work cycle guiding path and the return guiding path.

8. The apparatus according to claim 6, wherein pivotable guide elements are arranged in the guiding recess, namely a first guide element on the starting position side in the region of the transition from the return guiding path to the work cycle guiding path and a second guide element on the end position side in the region of the transition from the work cycle guiding path to the return guiding path.

9. The apparatus according to claim 8, wherein the first and second guide elements are each arranged so as to be pivotable out of and into the path plane of the guiding recesses.

10. The apparatus according to claim 9, wherein the first guide element comprises a return guiding path blocking element which is configured and adapted to allow the guiding element to pass during the return cycle by pivoting out of the path plane of the return guiding path and, after the guiding element has passed, to block the return guiding path for passage of the guiding element during the work cycle by pivoting of at least the return guiding path blocking element into the path plane of the guiding recess of the return guiding path.

11. The apparatus according to claim 10, wherein the return guiding path blocking element comprises a first guiding element sensing part and a work cycle guiding path part, wherein the first guiding element sensing part is of ramp-like form with a width that increases contrary to the conveying direction, and wherein the work cycle guiding path part forms at least a first wall section of the work cycle guiding path.

12. The apparatus according to claim 9, wherein the second guide element comprises a work cycle guiding path blocking element which is configured and adapted to allow the guiding element to pass during the work cycle by pivoting out of the path plane of the work cycle guiding path and, after the guiding element has passed, to block the work cycle guiding path for passage of the guiding element during the return cycle by pivoting of at least the work cycle guiding path blocking element into the path plane of the guiding recess of the work cycle guiding path.

13. The apparatus according to claim 12, wherein the work cycle guiding path blocking element comprises a second guiding element sensing part and a return guiding path part, wherein the second guiding element sensing part is of ramp-like form with a width that increases in the conveying direction, and wherein the return guiding path part forms at least a second wall section of the return guiding path.

14. The apparatus according to claim 9, wherein the first guide element and the second guide element are configured such that they pivot back into the path plane automatically.

15. The apparatus according to claim 14, wherein there are arranged on the first guide element and/or on the second guide element restoring means which are adapted to pivot those elements back into the path plane automatically.

16. The apparatus according to claim 1, wherein the conveyor device comprises a conveyor chain, on which the receiving elements are arranged, and a drive for driving the conveyor chain, wherein the drive comprises at least one continuously revolving belt drive or chain drive with which the longitudinal slide is coupled by means of a coupling rod.

17. The apparatus according to claim 1, wherein the positioning unit comprises a longitudinal slide spring unit which is configured and adapted to be spring-pretensioned between the longitudinal slide and the carrier element when a predefined return position of the longitudinal slide is reached during a return cycle.

18. The apparatus according to claim 17, wherein the longitudinal slide spring unit comprises at least one longitudinal spring element which is arranged on one side on the carrier element and the one free longitudinal spring element side of which is adapted to come into mechanical contact with a longitudinal counter-surface element arranged on the longitudinal slide when the predefined return position is reached.

19. The apparatus according to claim 18, wherein the at least one longitudinal spring element is in the form of a compression spring or in the form of a tension spring.

20. The apparatus according to claim 17, wherein the longitudinal slide spring unit comprises at least one longitudinal spring element which is arranged on one side on the longitudinal slide and the one free longitudinal spring element side of which is adapted to come into mechanical contact with a longitudinal counter-surface element arranged on the carrier element when the predefined return position is reached.

21. The apparatus according to claim 1, wherein the positioning unit comprises a transverse slide spring unit which is configured and adapted to be spring-pretensioned between the transverse slide and the longitudinal slide when a predefined deflected position of the transverse slide is reached during a work cycle.

22. The apparatus according to claim 21, the transverse slide spring unit comprises at least one transverse spring element which is arranged on one side on the longitudinal slide and the one free transverse spring element side of which is adapted to come into mechanical contact with a transverse counter-surface element arranged on the transverse slide when the predefined deflected position is reached.

23. The apparatus according to claim 22, wherein the transverse slide spring unit comprises at least one transverse spring element which is arranged on one side on the transverse slide and the one free transverse spring element side of which is adapted to come into mechanical contact with a transverse counter-surface element arranged on the longitudinal slide when the predefined deflected position is reached.

24. The apparatus according to claim 22, wherein the at least one transverse spring element is in the form of a compression spring or in the form of a tension spring.

25. The apparatus according to claim 1, wherein the carrier element is adapted to as to be adjustable in terms of its position transverse to the conveying direction.

26. An apparatus for removing the wishbone from poultry carcasses, comprising an apparatus according to claim 1, wherein the articles are poultry carcasses, the receiving elements are adapted to hold in each case one of the poultry carcasses with its neck side facing the processing station, and the at least one processing tool is in the form of a wishbone removal unit.

27. A method for the moving-along tool positioning of linearly conveyed articles, comprising the steps:
conveying the articles by means of a plurality of receiving elements adapted to hold the articles in a conveying direction along a conveying line on which there is arranged a processing station having at least one processing tool adapted to process the articles, by means of a conveyor device forming the conveying line; wherein the processing station has a positioning unit adapted to position the at least one processing tool, wherein the positioning unit is formed by a longitudinal slide, which is slidable in the conveying direction relative to a carrier element, and a transverse slide, which is arranged on the longitudinal slide so as to be slidable transverse to the conveying direction;
driving the longitudinal slide in an oscillating manner such that the longitudinal slide on the one hand, in a work cycle, moves along synchronously with the receiving elements in the conveying direction from a starting position into an end position and on the other hand, in a return cycle, moves contrary to the conveying direction from the end position back into the starting position;
moving the transverse slide during the work cycle transverse to the conveying direction towards the receiving elements from a standby position into a working position and from the working position back into the standby position by means of at least one guiding element which engages into a stationarily arranged link guide; and
guiding the transverse slide without deflection during the return cycle transverse to the conveying direction by means of the link guide.

28. The method according to claim 27, further comprising:
moving the transverse slide during the work cycle by means of at least one work cycle guiding path of the link guide; and
moving the transverse slide during the return cycle by means of a return guiding path which extends linearly and runs parallel to the conveying line.

29. The method according to claim 28, wherein movement of the transverse slide takes place by means of the work cycle guiding path in the form of a cam track.

30. The method according to claim 27, wherein the guiding element is in the form of a guiding wheel which is guided in a rolling manner along the link guide.

31. The method according to claim 30, wherein the work cycle guiding path and the return guiding path of the link guides form guiding recesses in which the guiding wheel is guided.

32. The method according to claim 31, wherein the guiding wheel, in the respective transition regions between the work cycle guiding path and the return guiding path, runs in the respective guiding recesses at least substantially without guiding.

33. The method according to claim 31, further comprising pivoting of guide elements pivotably arranged in the guiding recess, namely a first guide element, which is arranged on the starting position side in the region of the transition from the return guiding path to the work cycle guiding path, and a second guide element, which is arranged on the end position side in the region of the transition from the work cycle guiding path to the return guiding path.

34. The method according to claim 33, further comprising pivoting of the first and second guide elements out of and into the path plane of the guiding recesses.

35. The method according to claim 34, further comprising:
pivoting of a return guiding path blocking element of the first guide element out of the path plane of the guiding recess of the return guiding path during the return cycle as the guiding element passes, in order to allow the guiding element to pass; and
pivoting of at least the return guiding path blocking element into the path plane of the guiding recess of the return guiding path after the guiding element has passed, in order to block the return guiding path for passage of the guiding element during the work cycle.

36. The method according to claim 35 wherein:
the pivoting out of the path plane takes place in that the guiding element comes into contact with a ramp-like first guiding element sensing part, which widens in the conveying direction, of the return guiding path blocking element, so that the return guiding path blocking element is pivoted out of the path plane; and for blocking the return guiding path during the work cycle, a work cycle guiding path part of the return guiding path blocking element forms at least a first wall section of the work cycle guiding path.

37. The method according to claim 34, wherein the first guide element and the second guide element pivot back into the path plane automatically.

38. The method according to claim 37, wherein the automatic pivoting back is effected by restoring means arranged on the first guide element and/or on the second guide element.

39. The method according to claim 33, further comprising pivoting of a work cycle guiding path blocking element of the second guide element out of the path plane of the work cycle guiding path during the work cycle as the guiding element passes, in order to allow the guiding element to pass; and pivoting of at least the work cycle guiding path blocking element into the path plane of the work cycle guiding path after the guiding element has passed, in order to block the work cycle guiding path for passage of the guiding element during the return cycle.

40. The method according to claim 39, wherein:

the pivoting out of the path plane takes place in that the guiding element comes into contact with a ramp-like second guiding element sensing part, which widens in the conveying direction, of the work cycle guiding path blocking element, so that the work cycle guiding path blocking element is pivoted out of the path plane; and for blocking the work cycle guiding path during the return cycle, a work cycle guiding path part of the work cycle guiding path blocking element forms at least a second wall section of the return guiding path.

41. The method according to claim 27, wherein the oscillating driving of the longitudinal slide takes place via a coupling rod which is coupled with a continuously circulating belt drive or chain drive which drives a conveyor chain on which the receiving elements of the conveyor device are arranged.

42. The method according claim 27, further comprising spring-pretensioning of a longitudinal slide spring unit, which acts between the longitudinal slide and the carrier element and is part of the positioning unit, when a predefined return position of the longitudinal slide is reached during a return cycle.

43. The method according to claim 42, wherein the spring-pretensioning of the longitudinal slide spring unit is effected by means of at least one longitudinal spring element which is arranged on one side on the carrier element and the one free longitudinal spring element side of which comes into mechanical contact with a longitudinal counter-surface element arranged on the longitudinal slide when the predefined return position is reached.

44. The method according to claim 42, wherein the spring-pretensioning of the longitudinal slide spring unit is effected by means of the at least one longitudinal spring element which is arranged on one side on the longitudinal slide and the one free longitudinal spring element side of which comes into mechanical contact with a longitudinal counter-surface element arranged on the carrier element when the predefined return position is reached.

45. The method according to claim 27, further comprising spring-pretensioning of a transverse slide spring unit, which acts between the transverse slide and the longitudinal slide, when a predefined deflected position of the transverse slide is reached.

46. The method according to claim 45, wherein the spring-pretensioning of the transverse slide spring unit is effected by means of at least one transverse spring element which is arranged on one side on the longitudinal slide and the one free transverse spring element side of which comes into mechanical contact with a transverse counter-surface element arranged on the transverse slide when the predefined deflected position is reached.

47. The method according to claim 45, wherein the spring-pretensioning of the transverse slide spring unit is effected by means of the at least one transverse spring element which is arranged on one side on the transverse slide and the one free transverse spring element side of which comes into mechanical contact with a transverse counter-surface element arranged on the longitudinal slide when the predefined deflected position is reached.

48. The method according to claim 27, wherein the position of the carrier element is adjustable transverse to the conveying direction.

49. A method for removing the wishbone from poultry carcasses, comprising carrying out the steps of the method according to claim 27, wherein the articles are poultry carcasses, in each case one of the poultry carcasses is held by means of the receiving elements with its neck side facing the processing station, and the wishbone of the poultry carcass is removed by means of the at least one processing tool, which is in the form of a wishbone removal unit.

* * * * *